United States Patent

Hannigan et al.

[11] Patent Number: 5,864,282
[45] Date of Patent: Jan. 26, 1999

[54] UNIQUE STRAIN RELIEF JUNCTION

[75] Inventors: John H. Hannigan, San Carlos; Raymond F. Crews, Boulder Creek, both of Calif.

[73] Assignee: Marchi Associates, Inc., Redwood City, Calif.

[21] Appl. No.: 753,773

[22] Filed: Nov. 29, 1996

[51] Int. Cl.$^6$ .................................................. H01C 7/04
[52] U.S. Cl. .......................... 338/30; 338/28; 338/229; 174/74 A; 374/208
[58] Field of Search .................................. 338/25, 26, 28, 338/30, 238, 233, 240, 229, 273; 374/208; 174/74 A, 76

[56] References Cited

U.S. PATENT DOCUMENTS

| | | | |
|---|---|---|---|
| 2,247,671 | 7/1941 | Tepel | 174/76 |
| 2,526,251 | 10/1950 | Medlar | 338/30 |
| 2,548,423 | 4/1951 | Cumming et al. | 174/77 R |
| 2,989,718 | 1/1961 | Muehlner | 338/174 |
| 3,163,703 | 12/1964 | McLoad | 174/11 R |
| 3,573,346 | 4/1971 | Appleby | 174/76 |
| 3,619,481 | 11/1971 | Smith | 174/76 |
| 3,916,086 | 10/1975 | Gillemot et al. | 174/76 |
| 3,966,500 | 6/1976 | Brixy | 136/232 |
| 4,085,398 | 4/1978 | Bertram et al. | 338/25 |
| 4,204,186 | 5/1980 | Parisi et al. | 338/30 |
| 4,398,169 | 8/1983 | Hayashi | 338/25 |
| 4,469,717 | 9/1984 | Baxter et al. | 427/102 |
| 4,492,948 | 1/1985 | Clayton et al. | 338/25 |
| 4,647,719 | 3/1987 | Campbell | 174/76 |
| 4,878,039 | 10/1989 | Kraemer | 338/26 |
| 4,987,749 | 1/1991 | Baier | 62/222 |
| 5,010,322 | 4/1991 | Fry et al. | 340/700 |
| 5,140,746 | 8/1992 | Debbaut | 174/76 |
| 5,152,049 | 10/1992 | McQueen | 29/611 |
| 5,161,894 | 11/1992 | Bourigault | 374/185 |
| 5,252,779 | 10/1993 | DiRienzo | 174/76 |
| 5,271,975 | 12/1993 | Solano | 174/74 A |
| 5,275,788 | 1/1994 | Stelts | 374/208 |
| 5,520,974 | 5/1996 | Chiotis et al. | 174/76 |
| 5,584,578 | 12/1996 | Clauss, Jr. | 374/208 |

FOREIGN PATENT DOCUMENTS

| | | | |
|---|---|---|---|
| 57-56728 | 4/1982 | Japan | 338/25 |
| 322520 | 12/1929 | United Kingdom | 338/238 |
| 774831 | 5/1957 | United Kingdom | 338/238 |

Primary Examiner—Michael L. Gellner
Assistant Examiner—Karl Easthom
Attorney, Agent, or Firm—Michael A. Glenn; Donald M. Hendricks

[57] ABSTRACT

A temperature measurement system provides improved thermal sensors, including thin film and wire wound RTD's having fast and accurate measurement response times. Thermal sensor housing materials are matched to those of the material being measured, thereby minimizing the use of interface potting materials that would otherwise impose a thermal gradient. A screw-in mounting stabilizes a connection between the housing and the material being measured. Double and triple shielded thermal devices are provided to filter RFI and EMI. Improved surface measurements of high temperatures are obtained by incorporating a thermal mass into thermocouple housing designs. Additionally, a unique stain relief allowing access to sensor leads and wire leads by a side opening, prior to adding doping compound and a conductive outer sheath, is described.

14 Claims, 11 Drawing Sheets

UNIQUE STRAIN RELIEF JUNCTION

FIELD OF THE INVENTION

The invention relates to the field of temperature measurement devices. More particularly, the invention relates to improved construction and shielding techniques for thermocouples and resistance temperature detectors.

BACKGROUND OF THE INVENTION

Resistance temperature detectors (RTDs) are used to measure temperature by relating the electrical resistance across the RTD to the temperature. As the temperature being measured rises, so does the resistance across the RTD. RTDs are a common alternative to thermocouples for temperature measurement. While RTD's are generally more accurate than thermocouples, they are usually much slower, due to a stainless steel housing.

R. Bertram, G. Norgate and R. Isles, Thin Film Resistance Temperature Detector, U.S. Pat. No. 4,085,398 18 Apr. 1978) discloses a resistance temperature detector which "includes a substrate of refractory dielectric material having two or more holes bored through it." A plug of electrically conductive material is fixed within each hole in proximity to one end surface of the substrate, with the plug surface preferably having a concave meniscus shape and consisting of a metal alloy such as Ni—Ti. Lead wires, such as Ni wires, are located in the holes and are connected to the plugs through the other end surface. A film of temperature dependent resistance material is deposited on the one end surface of the substrate and is connected to the two plugs. The film may consist of a thin sensing film of metal such as platinum or of a semiconductor material, deposited in a selected pattern on the substrate and in direct contact with the plugs, or the sensing film may be deposited so as to connect pads of the electrical conducting material which are deposited to cover at least a portion of the plugs. The end surface of the RTD may further have a layer of electrical insulating material to protect the sensing film.

Temperature sensors have commonly used a simple stainless steel sheath as a shield against signal noise. Current applications for specialized industries have subjected temperature sensors to widely varying RFI and EMI signals, and combinations thereof which significantly degrades this accuracy of temperatures measured by such sensors.

J. Fry, and G. Hall, Housing for a Process Controller, U.S. Pat. No. 5,010,322 (23 Apr. 1991) discloses a combustion control system which "includes a sensor assembly and a process controller, the sensor assembly including sensors for providing output signals indicative of process variables, the process controller responding to the output signals to maintain a desired operation of the process .... A housing enclosing the process controller provides EMI/RFI shielding of the process controller including the attenuation and absorption of the EMI/RFI energy."

While Fry et al. discloses EMI/RFI shielding for a process controller, it fails to address improved EMI/RFI shielding for temperature sensors.

In the construction and use of temperature sensors, the connection between the temperature sensor and lead wire has always created problems, both in providing a robust mechanical and electrical connection between the two, and in providing adequate shielding of the connection in some applications. Prior art junction designs have proven difficult to manufacture, and often result in breakage or frequent mandatory inspection or service.

Some prior art approaches have disclosed more robust devices, but have failed to disclose improved sensor to lead wire strain relief construction techniques. C. Kraemer, Apparatus and Method for Providing a Strain-Resistant Resistance Temperature Detector, U.S. Pat. No. 4,878,039 (31 Oct. 1989) discloses a "strain-resistant resistance temperature element for a temperature averaging sensor and apparatus for producing same. Thin metal wire, typically of platinum, is attached to both sides of a high temperature, pliable yet stretch/strain resistant tape. A somewhat wider tape of similar description is then applied to both sides of the tape containing the sensor wire. As a result, a highly pliable, yet stretch/strain resistant temperature detector is provided".

The disclosed prior art systems and methodologies thus provide some methods for addressing response time, accuracy, and integrity of temperature sensors, but fail to provide highly accurate, fast response time RTDs with stable mounting techniques, or to provide advanced sensor RFI/EMI shielding or sensor-to-lead-wire strain relief techniques. The development of such improvements to a temperature measurement system would constitute a major technological advance.

SUMMARY OF THE INVENTION

A temperature measurement system and methods of its use are provided. A first embodiment of the invention provides thin film and wire wound RTD's and thermocouples make use of materials specially favorable to the rapid transfer of heat to the sensing element, greatly increasing sensor accuracy and reducing the time to reach stability. A second series of embodiments provide shielding unique for filtering RFI and EMI interference signals from the temperature measuring elements. A third embodiment provides improved surface measurements of high temperatures. A fourth embodiment provides a unique stain relief junction that can be used alone, or in conjunction with the other disclosed embodiments.

DETAILED DESCRIPTION OF PREFERRED EMBODIMENTS

Improved Thermocouples and Thin Film/Wire Wound Resistance Temperature Devices (RTDs)

A resistance temperature detector (RTD) assembly is an alternative to a thermocouple for temperature measurement. RTD's are generally more accurate than thermocouples, but are usually much slower, due to a stainless steel housing. Stainless steel is a poor thermal conductor. RTD's also have the advantage of their small size, versus that of a thermocouple, where accuracy is mass-dependent (i.e. the more accurate, the larger the wires required). The accuracy of an RTD assembly is typically ±0.1 degree Centigrade versus that of a thermocouple, whose accuracy is typically ±1 degree Centigrade (i.e. RTDs are about ten times more accurate than thermocouples, regardless of temperature).

In many industrial processes, including the production of dielectric materials, wafers and microchips, it is critical to read temperatures as quickly and accurately as possible. The thin film RTD assembly and the wire wound RTD assembly discussed herein provide fast and accurate measurement for these processes, within a sturdy assembly that is easy to install and remove.

Most currently available thermal sensors, such as thermocouples and RTD's are sheathed in stainless steel. The invention includes thermocouples and two embodiments of RTD's having "wire-wound" and "thin film" construction, which may include at least the following unique features:

1) The thermal sensor assembly housing is manufactured from materials that are the same as, or similar to, the material of the measured surface. The use of matching materials significantly decreases response time during temperature measurement, while retaining the traditional accuracy of RTDs (e.g. ceramic/ceramic, aluminum/aluminum, steel/steel);

2) The use of interface potting materials, such as epoxy or ceramics, is minimized. This decreases the response time for temperature measurement; and 3) A novel "screw-in" mounting is used to stabilize the connection.

Figure 1:
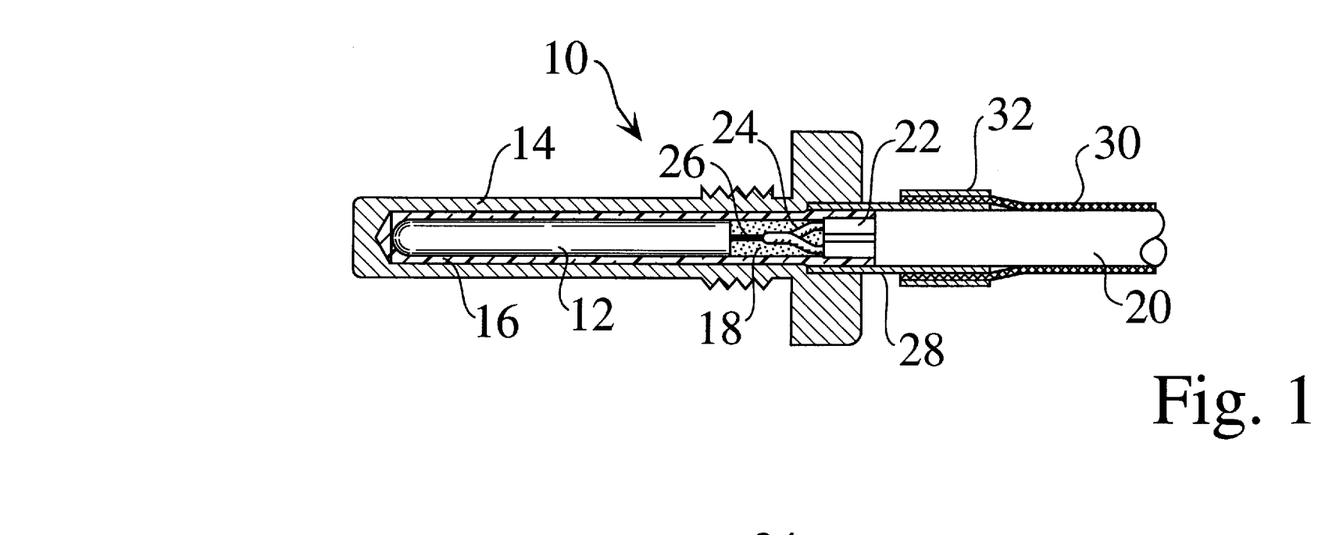
FIG. 1 provides a cross sectional view of an RTD potted within an aluminum housing according to the invention.

FIG. 1 provides a cross sectional view of an RTD assembly 10, which includes an RTD 12 potted within an aluminum housing 14. Thermal contact is made between the RTD 12 and the aluminum housing 14 by using a thermal conducting ceramic cement 16. Behind the RTD 12, magnesium oxide cement is used to provide lead isolation for leads 26, fused and flattened cable pairs 24, and spot welded junctions 25. A stainless steel sleeve 28, copper cable outer braid 30, and a stainless steel crimp sleeve 32 are used to provide protection for the cable 20 and its connection to the housing 14.

Figure 2:
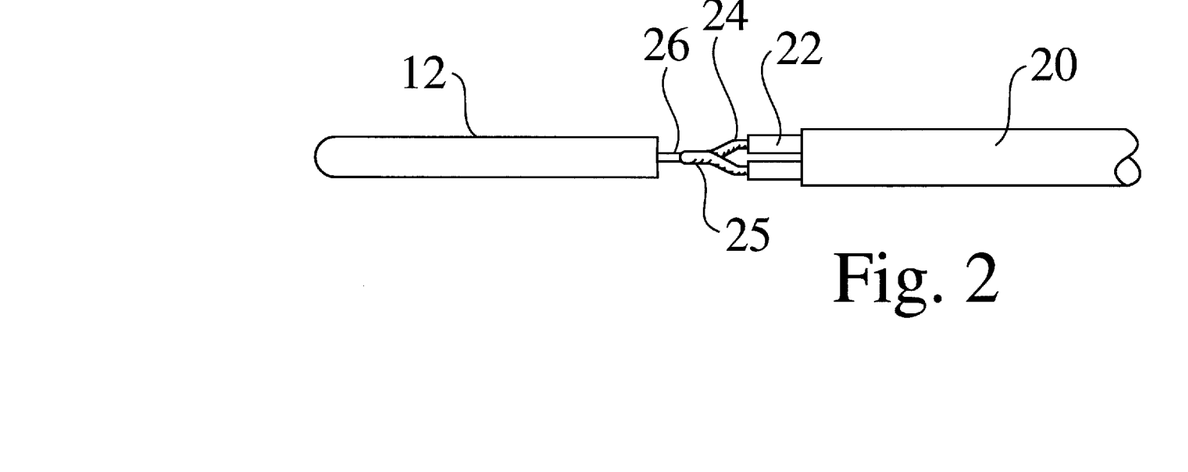
FIG. 2 shows an enlarged view of an RTD with leads spot welded to fused and flattened cable pairs according to the invention.

FIG. 2 shows an enlarged view of an RTD 14 with leads 26 spot welded 25 to fused and flattened cable pairs 24, which extend from cable leads 22 and cable 20.

Figure 3:
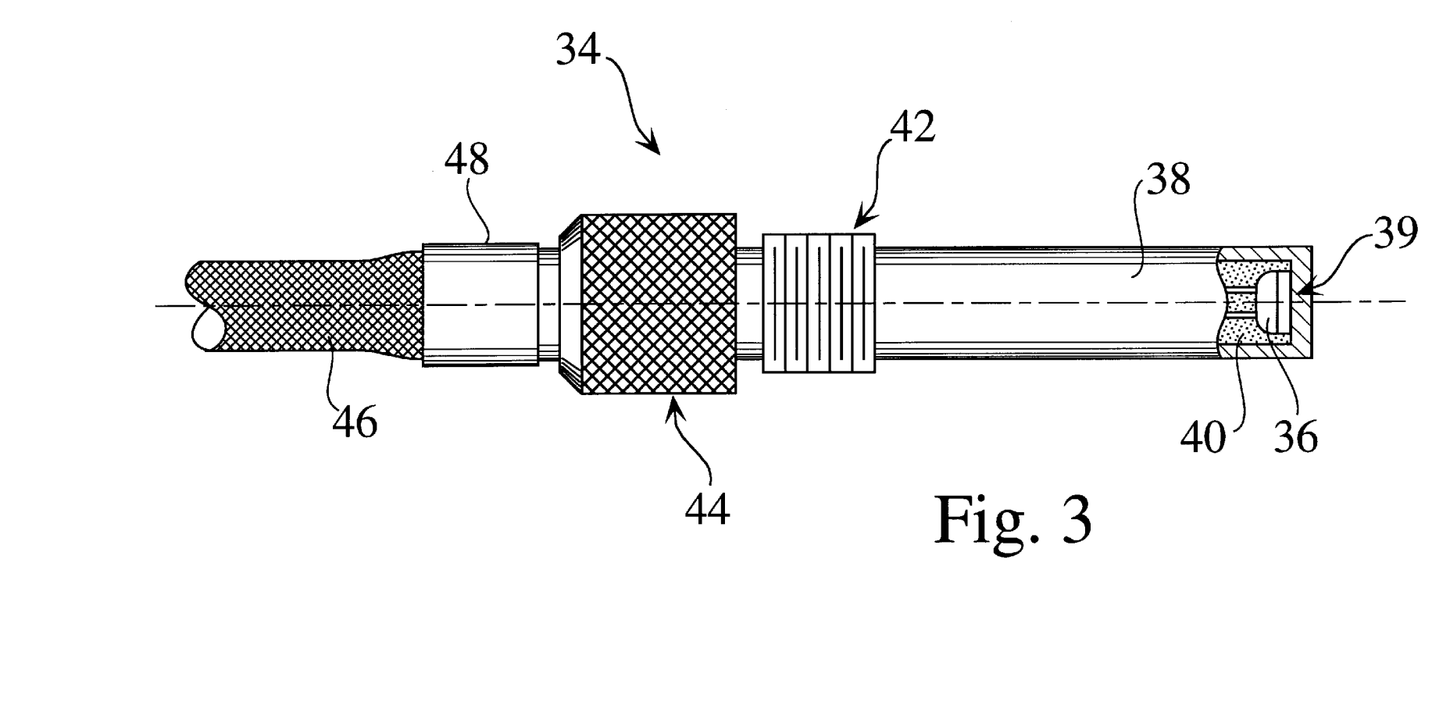
FIG. 3 provides a side view of a fast response thin-film RTD designed to operate up to approximately 300° C. according to the invention.

FIG. 3 provides a side view of a fast response thin-film RTD assembly 34 designed to operate up to approximately 300° C., although higher temperatures are available. A cylindrical, thin film RTD 36 is mounted directly to the bottom of the thin film RTD housing 38, in contrast to the RTD assembly 10 of FIG. 1. The RTD sensor 12 is placed down inside this housing, and relies on surrounding thermal conducting ceramic cement 16 to transfer heat.

The thin film RTD 36 is bonded directly to the bottom of the thin film RTD housing 38, using a strain-gauge cement 39. Bonding allows an extremely 10 small gap of about two ten-thousandths of an inch, which allows good thermal conductivity between the thin film housing 38 and the thin film RTD 36. Current embodiments of the invention use M-Bond 610™ as an adhesive 39 (manufactured by Micromeasurement, of South Carolina). The interior of the housing, surrounding the thin film RTD 36, is filled with magnesium oxide ceramic potting 40. The ceramic potting 40 serves both to hold the thin film RTD 36 in place, to fill voids, and to eliminate air or moisture from the assembly 34. The thin adhesive bond 39 between the RTD sensor 36 and the housing 38 results in extremely fast response times for the RTD assembly 34.

Figure 4:
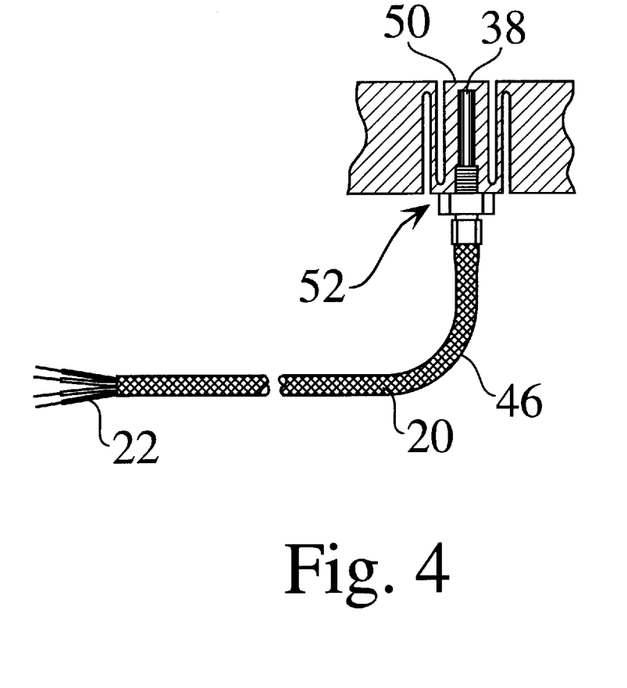
FIG. 4 illustrates a wire wound RTD probe assembly with a hard anodized aluminum case threaded within a mounting hole according to the invention.

FIG. 4 illustrates a thin film RTD probe assembly 34 having a hard anodized aluminum housing 38 threaded within a mounting hole 52. Aluminum cannot be easily threaded into aluminum because it tends to gall, and eventually welds itself to the member. Therefore, the RTD housing 38 is hard-anodized to achieve about 63 Rockwell C. The RTD housing 38 can then be threaded into an aluminum mounting hole 52 and readily taken out again.

While other methods to coat the RTD housing can be used, including plating, clear and colored anodizing, and industrial powder coatings, hard anodizing to achieve a black aluminum oxide finish is most preferred. Hard anodizing works effectively to prevent galling when the housing is mounted within a mounting hole, and the black oxide finish provides an excellent "black body" to promote effective heat transfer between the mounting hole 52 and the RTD housing 38.

The aluminum housing 38 is designed to ensure that the RTD 36 is in intimate thermal contact with the internal surface of the housing 38, using a close tolerance inside, which in one embodiment is about two mils.

Figure 5:
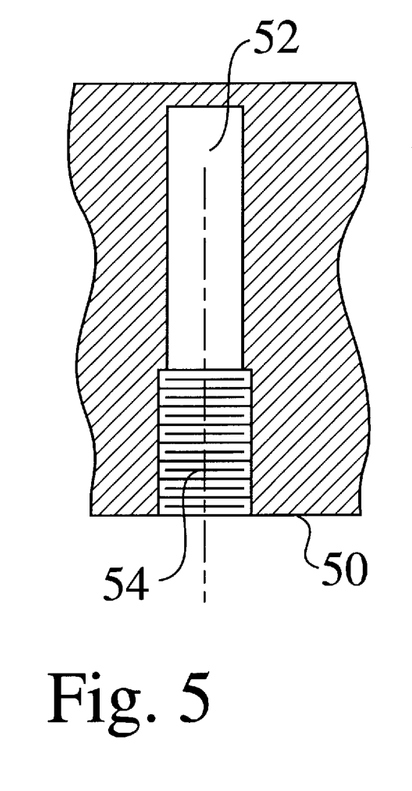
FIG. 5 is an enlarged cross-sectional view of the threaded mounting hole designed to provide a secure mechanical connection to the RTD assembly, while providing intimate thermal contact according to the invention.

FIG. 5 is an enlarged cross-sectional view of the threaded mounting hole 52 which provides a secure mechanical connection to the RTD assembly 34, while providing intimate thermal contact therebetween.

To improve response time and accuracy further, the material chosen for the RTD housing 38 is matched to the material being measured. For example, if the material and threaded mounting hole 52 in a process environment is steel, then the RTD housing is preferably made from steel. Likewise, if the material being measured is copper, a copper RTD housing 38 is preferred; and if the material being measured is ceramic, a ceramic RTD housing 38 is preferred. Matching the RTD housing 38 material to that of the material 50 being measured allows both materials to come into thermal equilibrium quickly without producing a significant thermal differential therebetween.

Figure 6:
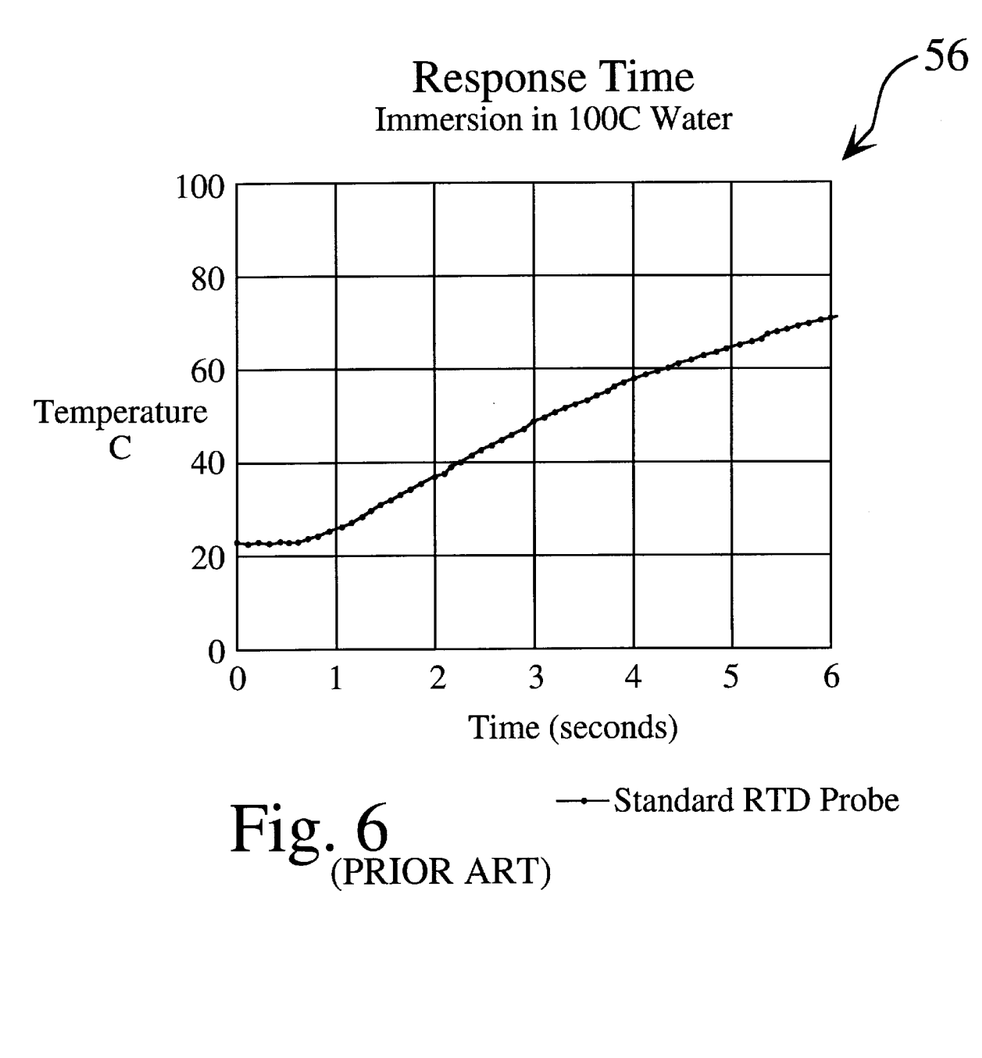
FIG. 6 is a chart which illustrates the response time for a standard RTD probe placed on 100° C. water.

Based on response time experiments, it has been found that both the "wire-wound" and "thin film" RTD embodiments of the invention provide greatly improved response times over those of conventional RTDs. FIG. 6 is a chart 56 which illustrates the characteristic response time for a standard RTD probe placed on 100° C. water. The resulting response time to reach a target 62.3% of the measured temperature is about 6 seconds. In a prior art RTD, there are two or three materials through which thermal energy must pass before it is transferred to the RTD. This results in a large time lag.

Figure 7:
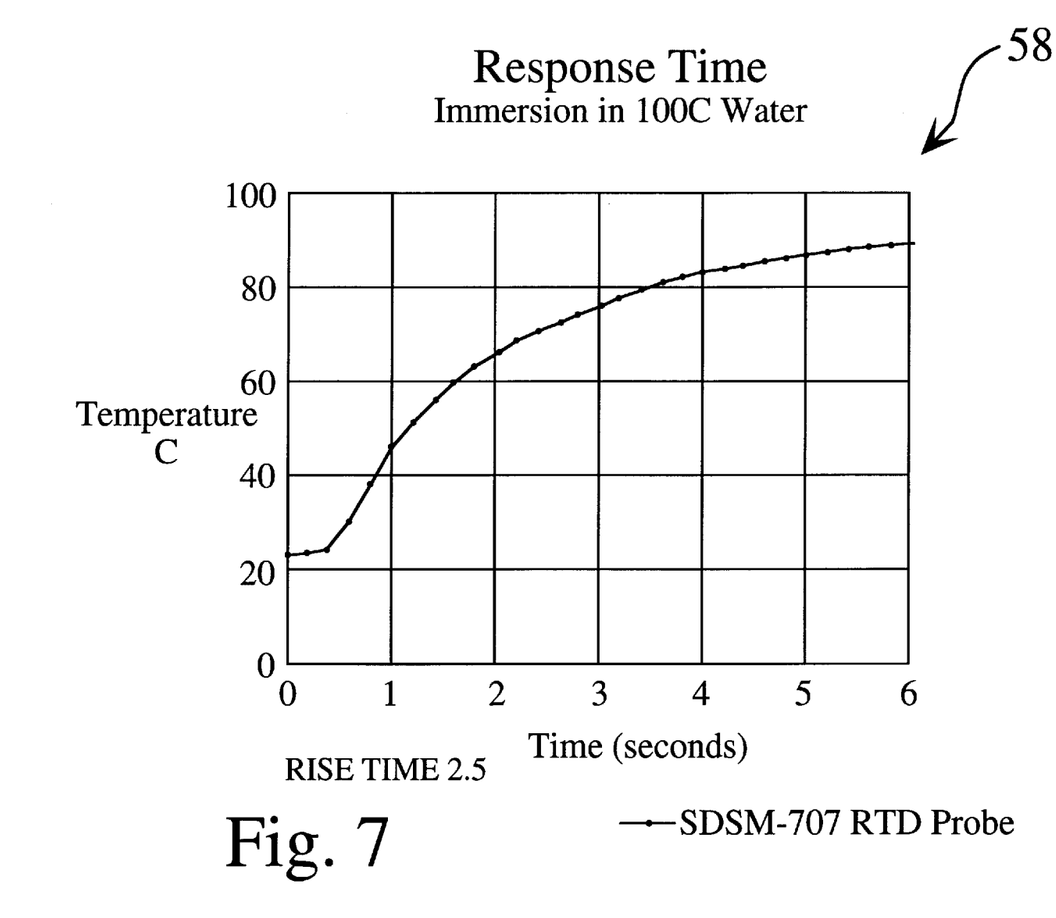
FIG. 7 is a chart which illustrates the response time for a wire-wound RTD probe placed on 100° C. water according to the invention.
Figure 8:
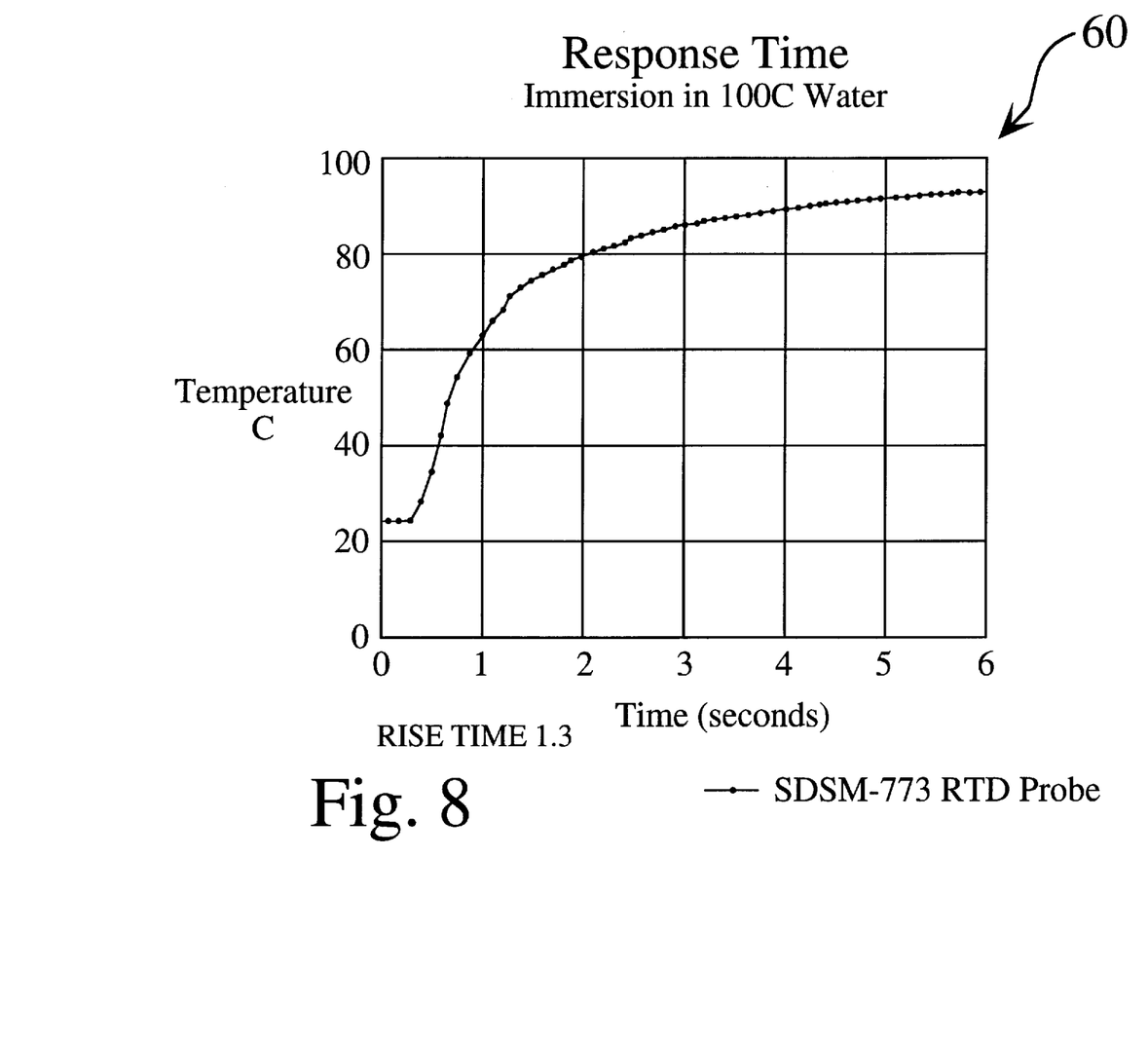
FIG. 8 is a chart which illustrates the response time for a thin-film RTD probe placed on 100° C. water according to the invention.

FIG. 7 is a chart 58 which illustrates the characteristic response time for a wire-wound RTD probe placed on 100° C. water. The resulting response time for the wire-wound RTD to reach a target 62.3% of the measured temperature is about 2.6 seconds. FIG. 8 is a chart 60 which illustrates the characteristic response time for a thin-film RTD probe 34 placed on 100° C water. The resulting response time for the thin-film RTD to reach a target 62.3% of the measured temperature is about 1.3 seconds. FIGS. 7 and 8 clearly illustrate the superior thermal response time afforded by an RTD that is constructed in accordance with the invention.

Shielded Thermal Sensors (Double and Triple), low temperature insertion device

Currently, there is often interference when measuring temperature with thermal sensors due to radio-frequency interference (RFI) and electromagnetic interference (EMI). Sheathing a thermal sensor in a particular metal can capture the RFI and EMI and run it to a ground. RFI can be captured using stainless steel, while capturing EMI requires the use of either soft iron or Mu metal. The shielding can be used either independently, in a double-shielded product, to filter out one type of noise (i.e. either RFI or EMI), or can be used in a triple shielded product to filter out both RFI and EMI. Recommended applications for a double and triple temperature sensor shield include, for example, semiconductor manufacturing, industrial instrumentation, and refinery processes.

Figure 9:
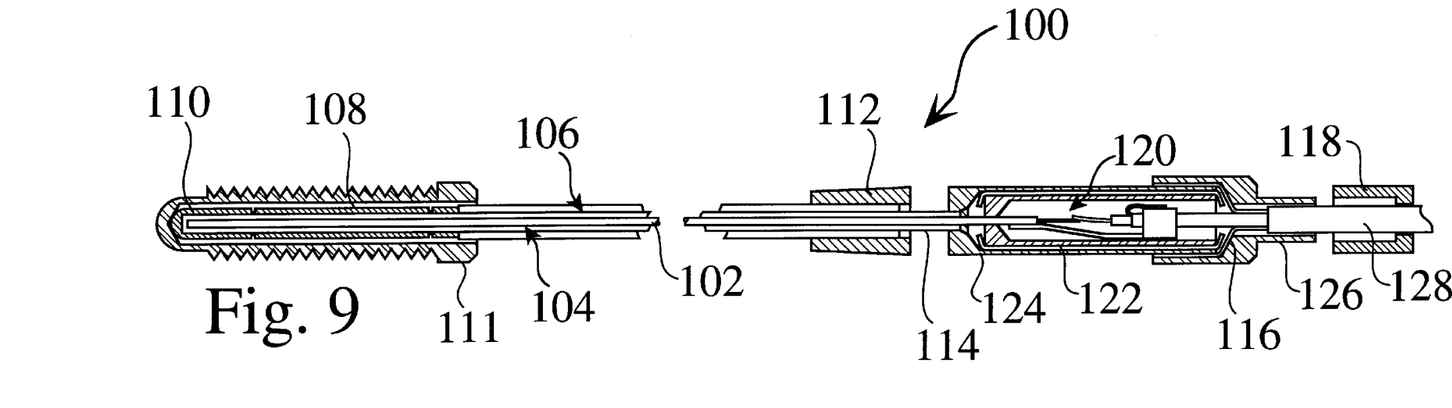
FIG. 9 is an expanded cross sectional illustration of a double-shielded thermocouple assembly using strain relief lead connection techniques according to the invention.

FIG. 9 is an expanded cross sectional illustration of a double-shielded thermocouple assembly 100 that includes one embodiment of a strain relief lead connection 120. A stainless steel sheathed ungrounded thermocouple 102 is surrounded along its length by an inner fluoropolymer isolation 104, such as provided by Teflon™ (produced by the DuPont Corporation). A stainless steel secondary shield 114 is located outside the inner isolation 104. An outer cylindrical fluoropolymer shell 106 is then located outside the stainless steel secondary shield 114. The sensing end of the thermocouple 102 is surrounded by isolator 108 and isolator tip 110, which reside within the thermocouple mounting housing 111. The lead end of the thermocouple 102 uses a strain relief assembly 120 to connect to double-shielded thermocouple cable 128. The strain relief assembly 120 is surrounded by an inner shell 122 which is in contact with the stainless steel sheathed ungrounded thermocouple 102. The strain relief is also surrounded by an outer shell 124, which is in contact with both the stainless steel secondary shield 114 and conductive copper braid, and which extends from the double-shielded thermocouple cable 128. An end cap 126 and a Teflon™ breech cap are used to seal and shield the cable 128 as it enters the strain relief assembly 120.

Alternate embodiments of the double 100 and triple shielded thermal sensors can also include the strain relief assembly discussed below. While the strain relief assembly 120 shown in FIG. 9 is intended for a single circuit, the assembly can be modified for a dual circuit, which would include two thermocouples in the sheath 102. In a dual thermocouple embodiment there are four wires extending from the thermocouple 102, and four leads extending from the cable 128.

Figure 10:
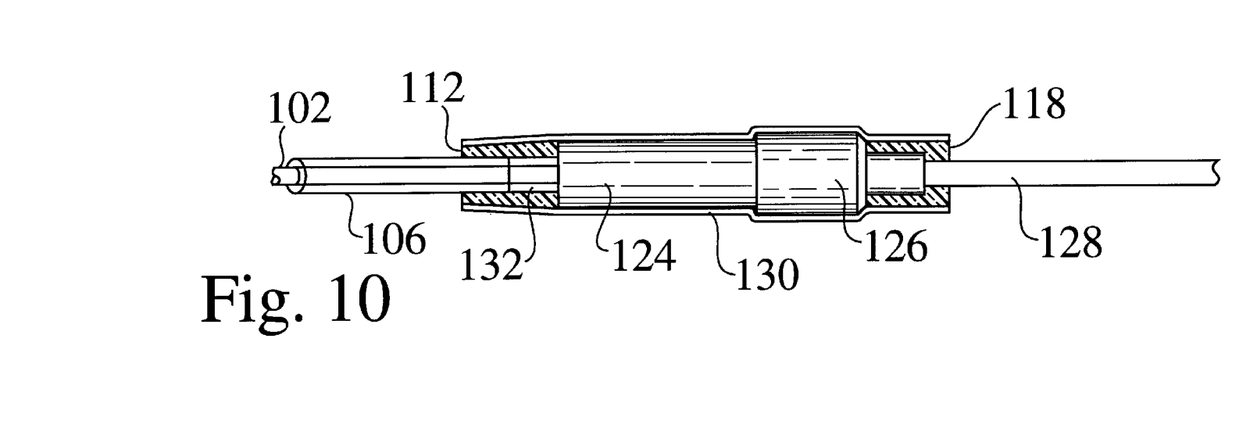
FIG. 10 is an enlarged cutaway view which depicts details of a double-shielded thermocouple assembly according to the invention.

FIG. 10 is an enlarged, detailed cutaway view of the double-shielded thermocouple assembly 100, which includes a fluoropolymer filler 132, a nose piece 112, and which is sealed by an outer fluoropolymer shrink seal 130.

Figure 11:
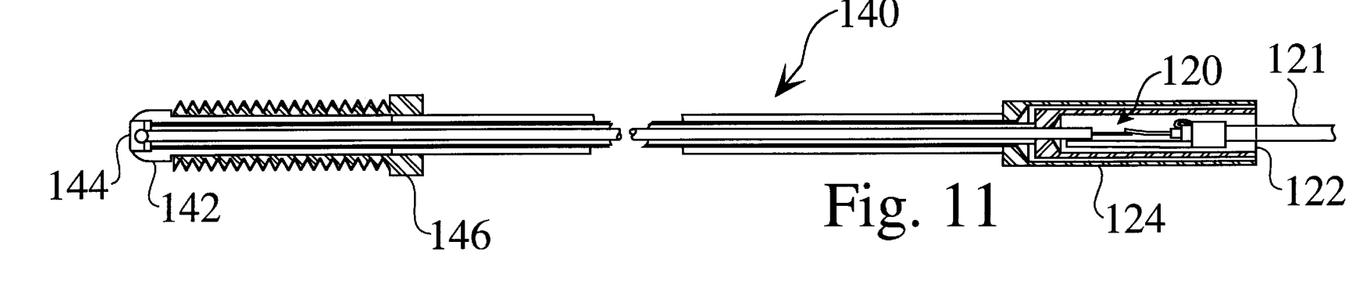
FIG. 11 is an expanded cross sectional illustration of a double-shielded thermocouple assembly for high temperature electrically isolated applications according to the invention.

FIG. 11 is an expanded cross sectional illustration of a double-shielded thermocouple assembly 140 for high temperature electrically isolated applications, which is designed for accurate surface temperature measurement. The thermocouple sheath is brazed to a copper collector 144, and is surrounded by a ceramic shell 142 within a threaded bulkhead 146. In use, the assembly 140 and copper collector 144 is placed in thermal contact with a surface to be measured.

Prior art thermocouple junctions are often placed directly upon surfaces to be measured, which results in an inaccurate temperature measurement, because ten diameters of the thermocouple on the surface of the material are typically needed to achieve an accurate temperature measurement. Prior art thermocouple leads act as a heat-sink, which transfers heat away from the thermocouple junction, and can result in an inaccuracy of as much as 20 degrees at the measuring instrument.

In the surface double-shielded thermocouple assembly 140, the copper collector 144 provides thermal mass to absorb heat and transfer it to the thermocouple. While other metals can be used for the collector 144, such as silver, copper is most preferred, because it provides extremely high thermal conductivity (K-factor).

Figure 12:
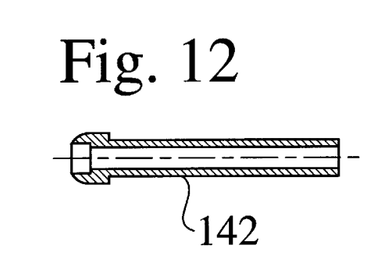
FIG. 12 is a detailed cross sectional view of an outer sheath for a thermocouple assembly according to the invention.

The ceramic shell 142 acts to electrically isolate the thermocouple 140 and the collector 144 for high temperature applications. FIG. 12 is a detailed cross sectional view of the ceramic shell 142. Copper can contaminate some industrial semiconductor processes, so the assembly 140 is encapsulated. The ceramic shell 142 is commonly constructed of aluminum oxide. Depending on the application, aluminum nitride can also be used for the ceramic shell 142 because aluminum nitride is a very good dielectric, as well as an excellent thermal conductor. Aluminum nitride adds thermal mass to the assembly 140, thereby supplementing the heat collecting ability of the copper collector 144. In specialized applications, such materials as beryllium oxide may also be an appropriate material for the shell 142.

While the ceramic shell 142 is an homogenous ceramic structure, anodized aluminum may also be used, depending on the application. For applications that are sensitive to contamination, the copper collector 144 can be plated.

The copper collector 144 can also be used for some thin film RTD 34 or wire wound RTD embodiments because copper is a good thermal conductor. In such an embodiment, the RTD 36 is glued to the inside of the copper collector 144. The thin film RTD 34 or wire wound RTD embodiments can also use and benefit from the double-shielding techniques described herein.

Figure 13:
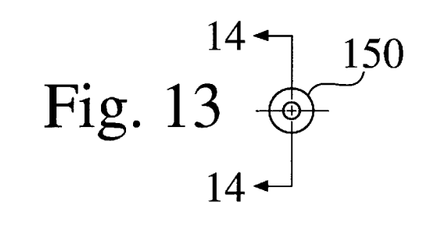
FIG. 13 is an end view of a cylindrical slug spacer for a thermocouple assembly according to the invention.
Figure 14:
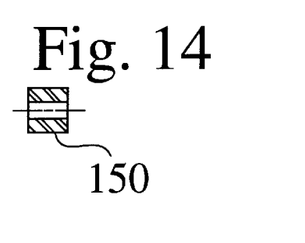
FIG. 14 is a cross sectional view of a cylindrical slug spacer for a thermocouple assembly according to the invention.
Figure 15:
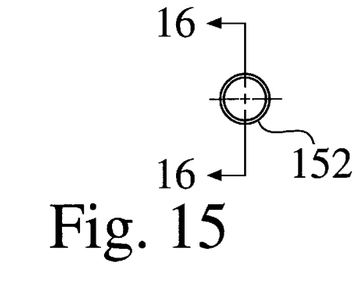
FIG. 15 is an end view of a lead junction shield for a thermocouple assembly according to the invention.

FIGS. 13–16 provide additional details of the foregoing thermocouple in particular:

FIG. 13 is an end view of a cylindrical slug spacer;

FIG. 14 is a cross sectional view of a cylindrical slug spacer;

FIG. 15 is an end view of a lead junction shield; and

Figure 16:
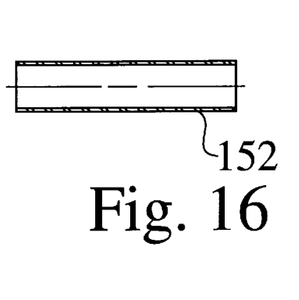
FIG. 16 is a cross sectional view of a lead junction shield for a thermocouple assembly according to the invention.

FIG. 16 is a cross sectional view of a lead junction shield.

Figure 17:
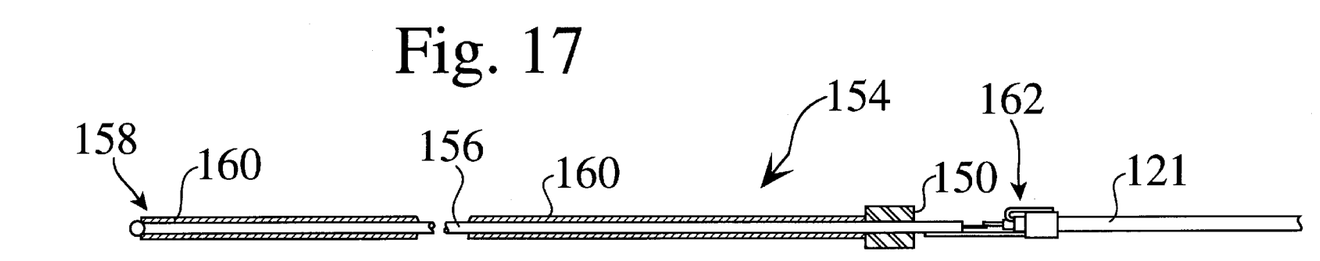
FIG. 17 is a cross sectional view of a partially assembled high-temperature, double-shielded thermocouple assembly with a cylindrical slug spacer swaged in place according to the invention.

FIG. 17 is a cross sectional view of a partially assembled high-temperature double-shielded thermocouple assembly 154 having a cylindrical slug spacer swaged 150 in place. In this embodiment, the thermocouple junction 158 is ungrounded, so it does not touch the sheath 156. The sheath acts as a primary shield. An insulator 160 is located outside the sheath 156. For high temperature applications, the insulator 160 is alumina. On the outside of the alumina insulator 160, a stainless steel tube can be used as a secondary shield. The primary and the secondary shielding both have transitions, which are isolated from one another, all the way back to the lead junction area 162. Separate ground leads are run to earth ground or instrument ground, or are allowed to float. In some applications, the ground leads can be tied to ground together.

In applications where RFI is present, the sheath on a standard thermocouple couples to the RF and, as a result, heats up. The heat thus generated is driven down into the thermocouple and gives it an additional amount of heat that significantly offsets the detected temperate from the actual temperature. The resultant heat gain can be as much as 70 or 80 degrees Celsius or more. If the RF source is eliminated, the temperature of the sheath returns to its ambient temperature. By using a secondary shield to couple the RF to ground, the thermocouple is not additionally heated by the shield, and therefore detects the actual temperature at the measured surface.

The outer shield intercepts the RF energy before reaching the inner sheath shield 156. Prior art devices rely on a shield 156 on a standard sheathed thermocouple. For regular noise, such as electrical noise from motors, prior art methods can be acceptable. For high frequency operation, however, the RF energy acts as an inductive furnace. The use of double shielding eliminates the thermal offset caused by the RF energy, while retaining the original envelope of the thermocouple. In practice, the leads coming out from the thermocouple look the same, except that the thermocouple is double-shielded, and the heating effect due to ambient RF energy is thereby eliminated.

The outer shield can be constructed of any conductor, such as Mu-metal or stainless steel. The use of Mu-metal also eliminates EMI because of its magnetic properties.

Figures 18, 19, 20:
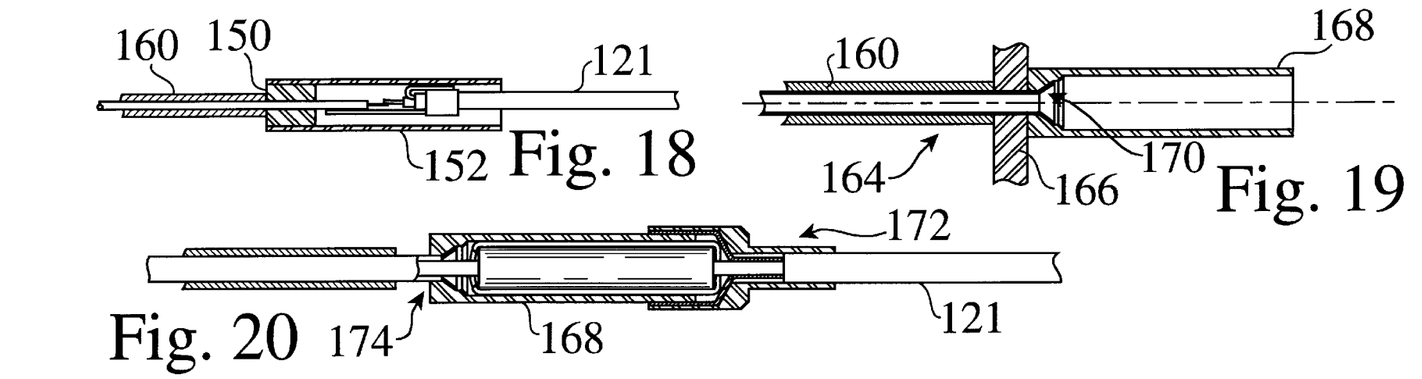
FIG. 18 is a detailed cross sectional view of a partially assembled high-temperature, double-shielded thermocouple assembly with a lead junction shield swaged to a cylindrical slug spacer according to the invention.
FIG. 19 is a detailed cross sectional view of an alternate embodiment for a high-temperature, double-shielded thermocouple assembly which uses a flared lead junction shield and a ceramic outer sensor shield according to the invention.
FIG. 20 shows a second alternate embodiment for a high-temperature, double-shielded thermocouple assembly which uses a flared lead junction shield and a ceramic outer sensor shield according to the invention.

FIG. 18 is a detailed cross sectional view of a partially assembled high-temperature, double-shielded, thermocouple assembly 154 having a lead junction shield 152 swaged to a cylindrical slug spacer 150.

FIG. 19 is a detailed cross sectional view of an alternate embodiment 164 for a high-temperature, double-shielded thermocouple assembly which uses a flared lead junction shield 168 and a ceramic outer sensor shield 160, and which is positioned with a clamp 166.

FIG. 20 shows a second alternate embodiment 172 for a high-temperature, double-shielded thermocouple assembly which uses a flared lead junction shield 168 with a brazed shield connection 174, and a ceramic outer sensor shield 160.

Figure 21:
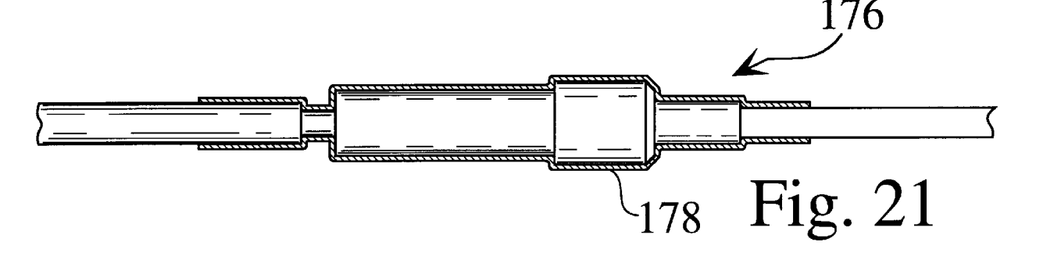
FIG. 21 shows a cutaway view of the second alternate embodiment for a high-temperature, double-shielded thermocouple assembly according to the invention.

FIG. 21 shows a detailed cutaway view 176 of the second alternate embodiment 172 for a high-temperature, double-shielded thermocouple assembly, which illustrates the outer cover 178.

Surface High Temperature Shielded Thermocouple

Figure 22:
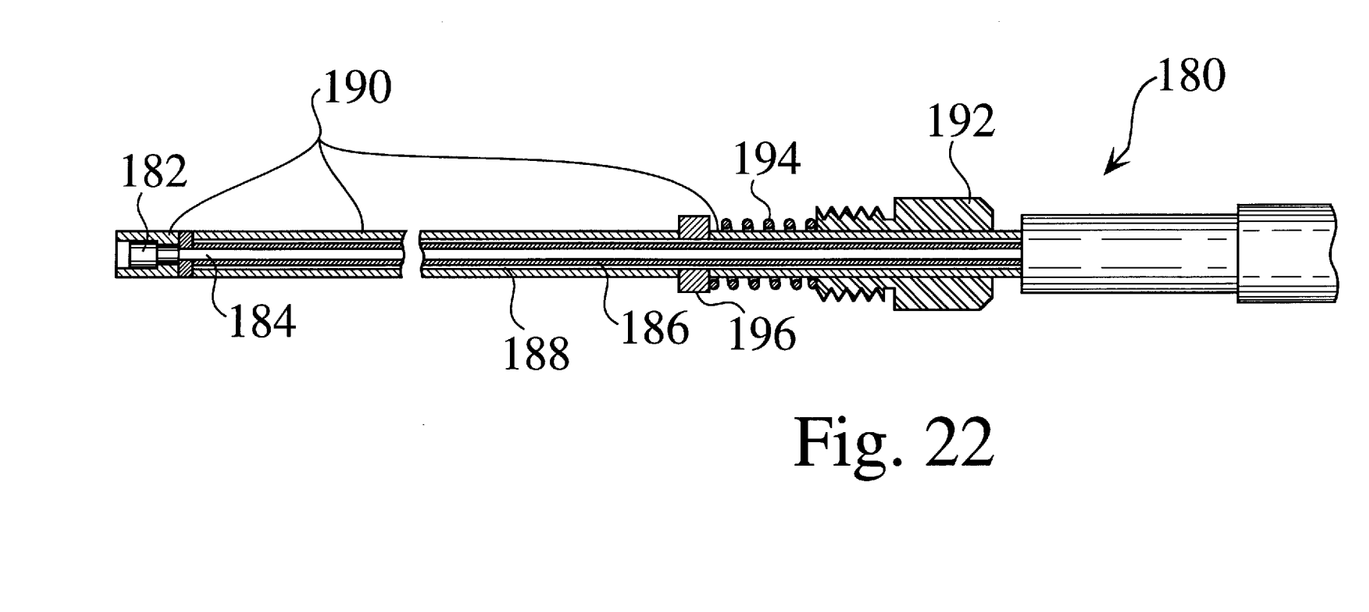
FIG. 22 shows a cross sectional view for a surface mount high-temperature, double-shielded thermocouple assembly according to the invention.

Prior art methods which are currently employed to measure surface temperatures are unsatisfactory. Presently, more than ten times the diameter of the thermocouple device is needed to obtain an accurate reading. FIG. 22 shows a cross sectional view for a surface mount high-temperature double-shielded thermocouple assembly 180. This embodiment provides a shielded insertion thermocouple which measures temperatures at low ranges. This embodiment can be shielded to remove RFI and/or EMI, but adds the feature of a copper collector 182 at the tip of a stainless steel sheathed thermocouple 184. Copper is an extremely good thermal conductor and allows accurate reading of surface temperatures. Use of the copper tip 182 allows extremely accurate measurement of surface temperatures.

The surface mount high-temperature double-shielded thermocouple assembly 180 includes an outer ceramic layer that includes a ledge 190. A knurled mounting screw serves to locate the assembly at a position where temperatures are to be measured. A compression spring 194, located between the knurled screw 192 and the ledge 190 positions the copper tip 182 in intimate thermal contact with the surface to be measured.

Thermocouple Strain Relief

Figures 23, 24, 25:
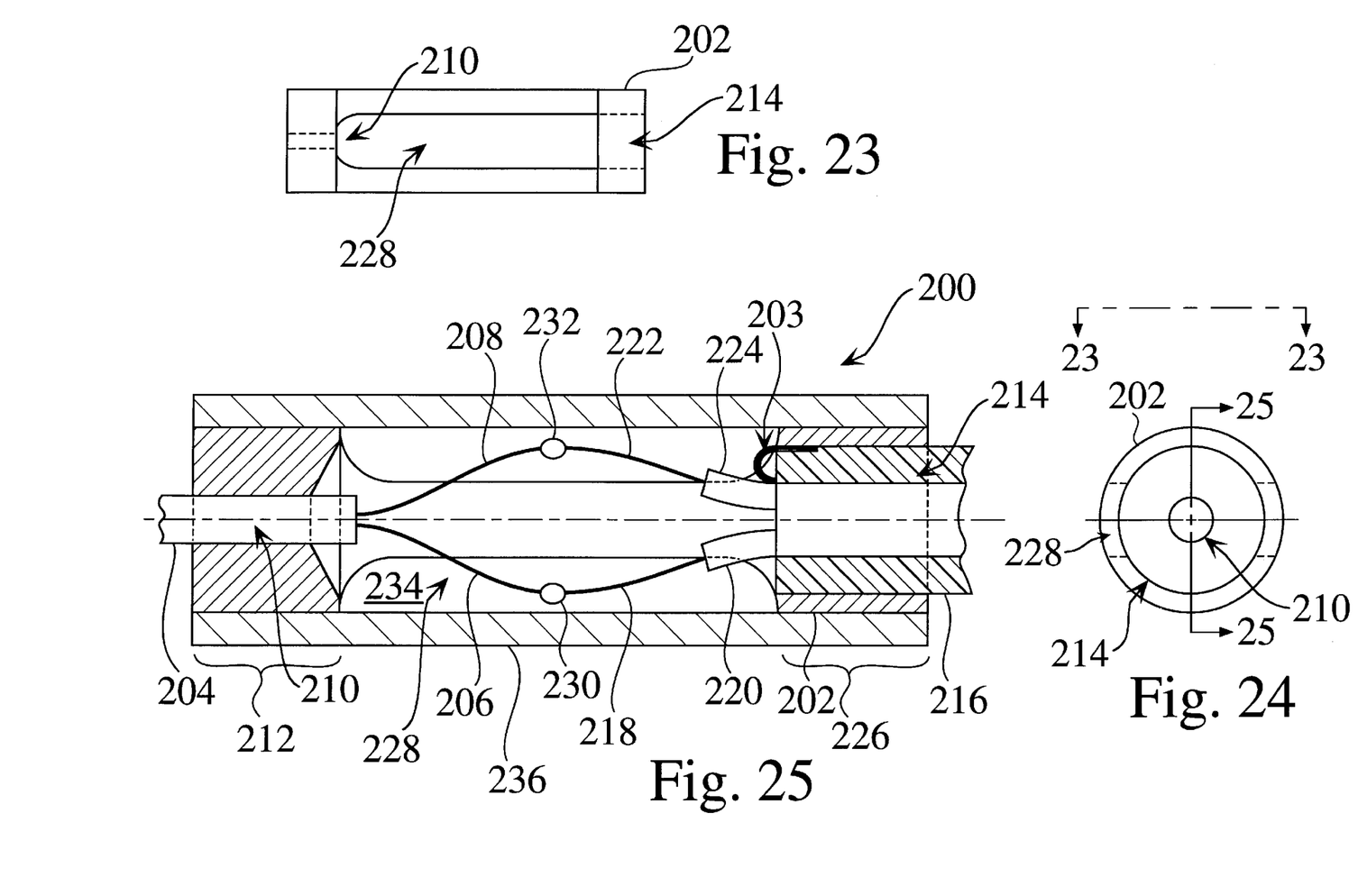
FIG. 23 shows a side view of an inner strain relief tube according to the invention.
FIG. 24 shows an end view of an inner strain relief tube according to the invention.
FIG. 25 provides a cross sectional view of a temperature sensor lead strain relief assembly according to the invention.

The invention also comprises an improved strain relief 200 which is provided to stabilize an interface between small diameter metal sheathed thermocouples and a flexible lead wire. An inner strain relief tube 202 is swaged to a sheathed thermocouple sensor 204 on one end, and is swaged to a lead wire 216 on the other end. The small sensor wires 206 and 208 of the thermocouple sensor 204 are then attached to the larger diameter of the lead wires 218 and 222, using silver-brazing or spot welding techniques. Because the sensor wires and lead wires are rigidly held by the inner strain relief tube 202, the integrity of the spot-welded or silver brazed connections is maintained during use of the thermocouple.

After the connections are made to the center region through an opening 228 on a side portion of the conductive inner strain relief tube the center region around the leads and connections is potted with an epoxy or ceramic cement doping compound 234.

This insures electrical and mechanical isolation of the connections from the strain relief assembly 200.

One embodiment of the invention provides a 360 degree mounting that does not have to be spot welded in place, as with prior art thermocouples. Use of the embodiment ensures a very strong assembly.

FIG. 23 shows a side view of the inner strain relief tube 202. FIG. 24 shows an end view of an inner strain relief tube 202, and FIG. 25 provides a cross sectional view of a temperature sensor lead strain relief assembly 200. An inner strain relief tube 202 is swaged to the sheath of a thermocouple sensor 204 on one end, flexible leads 218, 222 are located on the other end, and the leads are then crimped in place. By constraining the sensor 204 and sensor leads 206, 208, as well as the lead wire cable 216 and lead wire 218, 220, lead connections 230, 232 can be made easily, resulting in a very rugged finished assembly.

A drain wire 203 can also be used for shielding the strain relief assembly. The drain wire 203 is doubled back and crimped to the inner strain relief tube 202, which ties the primary shielding to the sensor sheath 204.

While the strain relief assembly is typically constructed from stainless steel, it can be made of any other conductive materials, such as copper, aluminum, or iron. Current embodiments of the strain relief assembly are about 0.625" long, with diameters ranging from about 0.125" up to about 0.188".

Once the sensor wires 206, 208 and lead wires 218, 222 are attached through connections 230, 232, the center region 228 is potted with an insulated doping compound 234, which is preferably an epoxy or ceramic cement, depending on the requirements of the junction and the application of the assembly. The doping compound 234 stabilizes, seals, and insulates the sensor wires 206, 208, lead wires 218, 222, and the connections 230, 232. Most epoxies or ceramic cements used for the doping compound include magnesium oxide, which is hydroscopic, thus preventing the absorption of moisture from the air. This aspect of the invention is important because the absorption of moisture by a thermocouple seriously degrades insulation resistance.

A metallic outer sheath 236 is then placed over the doped strain relief, and is swaged to the inner strain relief tube 202 to seal the assembly 200. It is preferred that the outer sheath 236 is made of a similar material to that of the inner strain relief tube 202 to avoid electron effects and to provide corrosion resistance. For many applications, stainless steel alloys, which offer high corrosion resistance, are used for the inner strain relief tube 202 and the outer sheath 236.

The strain relief assembly 200 can be used for all thermocouple assemblies, regardless of size, and can be applied to other applications that use sensitive microelectronic connections. This embodiment of the invention provides a more stable thermocouple connection, and extends the useful life of a thermocouple, without the need for repair of faulty or weakened spot welds.

Although the temperature measurement system and its methods of use are described herein in connection with thermocouples and resistance temperature detectors, the techniques can be implemented for other temperature measurement devices, as well as other electronic instrumentation, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. An assembly comprising:

a sheathed sensor having a sensor sheath and sensor leads extending therefrom;

a lead wire cable having wire leads extending therefrom;

a conductive inner strain relief tube having a first bore defined at a first end, said first bore receiving and rigidly confining said sensor sheath of said sheathed sensor, a second bore defined at a second end, said second bore receiving and confining said lead wire cable, and said conductive inner strain relief tube having a side portion with an opening therethrough to a central region, said central region of said conductive inner strain relief tube being between said first bore at said first end and said second bore at said second end, wherein said sensor leads and said wire leads form connections therebetween at said central region;

a doping compound extending throughout said central region of said conductive inner strain relief tube and around said sensor leads, said wire leads, and said connections; and a conductive outer sheath swaged to said conductive inner strain relief tube, and covering said doping compound and said central region;

wherein said opening allows access to said sensor leads and said wire leads to establish said connections at said central region when said doping compound and said conductive outer sheath are not present.

2. The apparatus of claim 1, wherein said inner sheath and said outer sheath are similar materials.

3. The apparatus of claim 2, wherein said tube and said outer sheath are constructed of stainless steel.

4. The apparatus of claim 2, wherein said tube and said outer sheath are constructed of copper.

5. The apparatus of claim 2, wherein said tube and said outer sheath are constructed of aluminum.

6. The apparatus of claim 2, wherein said tube and said outer sheath are constructed of iron.

7. The apparatus of claim 1, wherein said sheathed sensor is a thermocouple.

8. The apparatus of claim 1, wherein said sheathed sensor is a resistance temperature detector.

9. The apparatus of claim 1, wherein said sensor leads are silver brazed to said wire leads to form said connections.

10. The apparatus of claim 1, wherein said sensor leads are spot welded to said leads to form said connections.

11. The apparatus of claim 1, wherein said doping compound is an epoxy.

12. The apparatus of claim 1, wherein said doping compound is a ceramic cement.

13. The apparatus of claim 12, wherein said ceramic cement is magnesium oxide.

14. The apparatus of claim 1, wherein said lead wire cable includes a drain wire extending therefrom, and wherein said extended drain wire is crimped to said tube.

* * * * *